(12) United States Patent
Ueda et al.

(10) Patent No.: US 8,635,886 B2
(45) Date of Patent: Jan. 28, 2014

(54) COPPER-CONTAINING SILICA GLASS, METHOD FOR PRODUCING THE SAME, AND XENON FLASH LAMP USING THE SAME

(75) Inventors: Tetsuji Ueda, Koriyama (JP); Michinari Ohuchi, Koriyama (JP); Hiroyuki Nishimura, Koriyama (JP); Akira Fujinoki, Koriyama (JP); Masahiro Nakatsuka, Ikoma (JP); Hidetsugu Yoshida, Takatsuki (JP)

(73) Assignees: Shin-Etsu Quartz Products Co., Ltd., Tokyo (JP); Opto-Electronics Laboratory, Inc., Osaka (JP)

( * ) Notice: Subject to any disclaimer, the term of this patent is extended or adjusted under 35 U.S.C. 154(b) by 0 days.

(21) Appl. No.: 13/558,698

(22) Filed: Jul. 26, 2012

(65) Prior Publication Data

US 2012/0291488 A1 Nov. 22, 2012

Related U.S. Application Data

(63) Continuation of application No. 12/595,605, filed as application No. PCT/JP2008/058175 on Apr. 28, 2008, now abandoned.

(30) Foreign Application Priority Data

May 15, 2007 (JP) .................................. 2007-129707

(51) Int. Cl.
 *C03B 37/00* (2006.01)
 *C03B 20/00* (2006.01)
(52) U.S. Cl.
 USPC .............................. 65/32.1; 65/413; 65/421

(58) Field of Classification Search
 None
 See application file for complete search history.

(56) References Cited

U.S. PATENT DOCUMENTS 5,585,640 A 12/1996 Huston et al.
5,713,979 A * 2/1998 Nicholson et al. .............. 65/424

(Continued)

FOREIGN PATENT DOCUMENTS

EP 0 560 420 A1 9/1993
JP 05-254879 A 10/1993

(Continued)

OTHER PUBLICATIONS

Notification of Transmittal of Translation of the International Preliminary Report on Patentability, Dec. 3, 2009, PCT/JP2008/058175, 9 pp.

(Continued)

*Primary Examiner* — Matthew Daniels
*Assistant Examiner* — Lisa Herring
(74) *Attorney, Agent, or Firm* — Cheng Law Group, PLLC

(57) ABSTRACT

It is an object of the present invention to provide a copper-containing silica glass which emits fluorescence having a peak in a wavelength range of from 520 nm to 580 nm under irradiation of ultraviolet light with a wavelength of 400 nm or less, and which is excellent in long term stability even in the high output use. The copper-containing silica glass is made to have copper of from 5 wtppm to 200 wtppm, which emits fluorescence having a peak in a wavelength range of from 520 nm to 580 nm under irradiation of ultraviolet light with a wavelength ranging from 160 nm to 400 nm, and in which an internal transmittance per 2.5 mm thickness at a wavelength of 530 nm is 95% or more.

14 Claims, 2 Drawing Sheets

(56) References Cited

U.S. PATENT DOCUMENTS

| | | |
|---|---|---|
| 6,342,460 B1 | 1/2002 | Akimoto et al. |
| 2006/0037366 A1* | 2/2006 | Chen et al. ..................... 65/399 |
| 2006/0214134 A1* | 9/2006 | Masuda et al. .......... 252/301.4 F |
| 2007/0145332 A1* | 6/2007 | Koeppler et al. ....... 252/301.4 F |
| 2008/0018234 A1* | 1/2008 | Hiramatsu et al. ............ 313/503 |
| 2008/0166815 A1 | 7/2008 | Maruo et al. |

FOREIGN PATENT DOCUMENTS

| | | |
|---|---|---|
| JP | 2001-114530 A | 4/2001 |
| JP | 2004-115294 A | 4/2004 |
| JP | 2005-187262 A | 7/2005 |
| JP | 2005-255498 A | 9/2005 |
| JP | 2005-272243 A | 10/2005 |
| JP | 2006-044995 A | 2/2006 |

OTHER PUBLICATIONS

Strothman, "Measurement Equations and Tables", 2006, The Instrumentation, Systems, and Automation Society, pp. 301-309.
JP2001-114530 Machine Translation, Nov. 17, 2011.
JP2005-272243 Machine Translation Nov. 17, 2011.
JP2005-187262 Machine Translation Nov. 17, 2011.
International Search Report, PCT/JP2008/058175, May 28, 2008, 3 pages.
Supplementary European Search Report for the Application No. EP 08 74 0907 dated Jun. 5, 2013.

* cited by examiner

COPPER-CONTAINING SILICA GLASS, METHOD FOR PRODUCING THE SAME, AND XENON FLASH LAMP USING THE SAME

CROSS-REFERENCE TO RELATED PATENT APPLICATIONS

This application is a continuation of U.S. application Ser. No. 12/595,605, filed Oct. 12, 2009 which is a continuation of PCT/JP2008/058175 filed Apr. 28, 2008 which is a continuation of JP 2007-129707 filed May 15, 2007.

TECHNICAL FIELD

The present invention relates to a copper-containing silica glass which emits fluorescence having a peak in a wavelength range of from 520 nm to 580 nm under irradiation of ultraviolet light, a method for producing the same, and a xenon flash lamp using the same. In detail, the present invention relates to the copper-containing silica glass which is preferably used as a window material and a tube material of a xenon flash lamp device for exciting an Nd:YAG laser and a Ti:sapphire laser or a lamp tube of the xenon flash lamp, a method for producing the same, and a xenon flash lamp using the same.

BACKGROUND ART

Solid lasers represented by an Nd:YAG laser have advantages in that they are compact and easy in maintenance compared to gas lasers such as a $CO_2$ laser and also they can transmit laser light by optical fibers. For the above reasons, various processing techniques using solid lasers have been developed and realization of high power lasers are especially expected for the use of metal welding and cutting which need high energy.

As typical methods for exciting the Nd:YAG laser, there can be LD (Laser Diode) excitation and flash lamp excitation. The LD excitation can emit light having wavelengths required for exciting a laser medium so that a laser system with high efficiency can be constructed. However, a high power laser diode is so expensive that the device cost thereof also is very expensive, with the result that lamp excitation is still mainly used in the high power laser system. A flash lamp emits light over a wide wavelength ranging from ultraviolet light to visible light and near infrared light. However, the wavelengths of light required for exciting the Nd:YAG laser are the ranges of 530 to 550 nm and 580 to 600 nm, and the light of the other wavelengths than the said ones does not contribute to the excitation thereof. Therefore, there is a problem that the laser excited by a lamp disadvantageously is low in energy efficiency.

As described above, among the light emitted from the xenon flash lamp, the ultraviolet light with a wavelength of 400 nm or less not only does not contribute to the excitation but also is absorbed into Nd:YAG crystals to turn into heat so that light emitting efficiency may be impaired or solarization may be caused. Consequently, a glass tube used for a xenon flash lamp, such as M382 produced by Shin-Etsu Quartz Products Co., Ltd. is advantageously made to block the ultraviolet light. However, even in this case, the ultraviolet light is only blocked, which does not contribute to improve energy efficiency.

As a silica glass capable of converting a light wavelength, Patent Document 1 discloses a silica glass doped with divalent copper and aluminum. However, the silica glass is handled with complication due to two kinds of dopants. Further, there had been a problem that an optimum wavelength light for exciting Nd:YAG cannot be obtained from the silica glass because the fluorescence peak wavelength thereof is 500 nm or less. In addition, Patent Document 1 is silent on bubbles in the glass, and viscosity and an OH group concentration thereof The method for producing the silica glass shown in the Examples of Patent Document 1 is a sol-gel method in which a large number of OH groups remain in the glass and it is very difficult not to generate bubbles therein.

Patent Documents 2 and 3 disclose a copper-containing glass having a fluorescence peak wavelength ranging from 500 nm to 600 nm and a controlled OH group concentration. Especially, the glass disclosed in Patent Document 3 is a wavelength converting silica glass which is preferably used as a flash lamp for exciting Nd:YAG and improved oscillation efficiency of the laser is observed by using the silica glass.

In recent years, as a result of higher power laser having been developed, a flash lamp is required to have higher power and higher durability. However, when a flash lamp produced with the glass of Patent Document 3 was used under high power, although efficiency was clearly increased at an initial stage of the operation, deterioration of oscillation efficiency of the lamp was often observed after prolonged use. In other words, even the wavelength converting silica glass described in Patent Document 3 has not been capable of meeting the laser oscillation with high power and for long time which has recently been required.

Patent Document 1: JP 5-254879 A
Patent Document 2: JP 2005-187262 A
Patent Document 3: JP 2005-272243 A

DISCLOSURE OF THE INVENTION

Problems to be Solved by the Invention

It is an object of the present invention to provide a copper-containing silica glass which emits fluorescence having a peak in a wavelength range of from 520 nm to 580 nm under irradiation of ultraviolet light with a wavelength of 400 nm or less, and which is excellent in long term stability even in high power use.

It is also an object of the present invention to provide a method of producing the above mentioned copper-containing silica glass.

It is also an object of the present invention to provide a flash lamp using the copper-containing silica glass.

Means for Solving the Problems

As a result of extensive researches by the inventors of the present invention in order to solve the above-mentioned problems, it was found out that a copper-containing silica glass with a high visible light transmittance is small in performance deterioration even when a flash lamp is lighted with high power and for long time, thereby the present invention being completed.

That is, the copper-containing silica glass according to the present invention has copper of from 5 wtppm to 200 wtppm, and emits fluorescence having a peak in a wavelength range of from 520 nm to 580 nm under irradiation of ultraviolet light with a wavelength ranging from 160 nm to 400 nm, wherein an internal transmittance per 2.5 mm thickness at a wavelength of 530 nm is 95% or more.

The present inventors also found out that durability of the copper-containing silica glass was drastically improved by controlling viscosity, impurity concentrations and the number of bubbles thereof.

According to the silica glass of the present invention, it is preferable that the total cross-sectional area of bubbles each having a diameter of 0.08 mm or more which are contained in 100 cm$^3$ thereof is 0.1 mm$^2$ or less.

According to the silica glass of the present invention, it is also preferable that viscosity log$\eta$ at a temperature of 1,280° C. is from 11 to 12.5.

Further, according to the silica glass of the present invention, it is preferable that each of concentrations of Na, K, Mg, Ca and Al is less 25 than 1 wtppm.

In addition, according to the silica glass of the present invention, it is preferable that the OH group concentration is from 0.1 wtppm to 500 wtppm.

Also, as a result of extensive researches by the inventors of the present invention about a method for producing the copper-containing silica glass, it was found out that a silica porous body in which copper is introduced by a stuffing method is vitrified under a weak reducing atmosphere, whereby the copper-containing silica glass which meets the above mentioned demands can be produced.

That is, the method for producing the copper-containing silica glass according to the present invention comprises the steps of: a) depositing silica particles produced by hydrolyzing silicon compounds with an oxyhydrogen flame to obtain silica porous body, b) immersing the silica porous body obtained in the step a) in a solution containing copper ions, keeping it for a predetermined time, and then removing it from the solution to dry, and c) vitrifying the dried silica porous body under a weak reducing atmosphere at a temperature ranging from 1,350° C. to 1,600° C.

In the method of producing the copper-containing silica glass according to the present invention, as the weak reducing atmosphere there is preferably used a vacuum atmosphere in a graphite furnace or a mixed gas atmosphere of hydrogen and an inert gas containing hydrogen of 5 vol % or less.

In addition, in the method of producing the copper-containing silica glass according to the present invention, it is preferable that the step b) is followed by performing unstuffing.

Further, in the method of producing the copper-containing silica glass according to the present invention, in the step c) the silica porous body is preferably heated at a temperature ranging from 900° C. to 1,250° C. before vitrifying.

A xenon flash lamp of the present invention uses a silica glass tube which is produced with the copper-containing silica glass of the present invention.

Result of the Invention

The copper-containing silica glass according to the present invention has a great effect such that it is capable of converting ultraviolet light with a wavelength ranging from 160 nm to 400 nm to fluorescence having a peak in a wavelength range of from 520 nm to 580 nm very efficiently, thereby improving oscillation efficiency of the laser, and such that it is excellent in durability even in the high power use. For the above mentioned reasons, the copper-containing silica glass according to the present invention is effective as a tube material used in an ultraviolet lamp such as a xenon flash lamp, a window material of an ultraviolet lamp, and a glass converting an ultraviolet wavelength such as a fluorescent plate.

Further, according to the present invention, the copper-containing silica glass of the present invention can be easily obtained.

DESCRIPTION OF THE SYMBOLS

Figure 1:
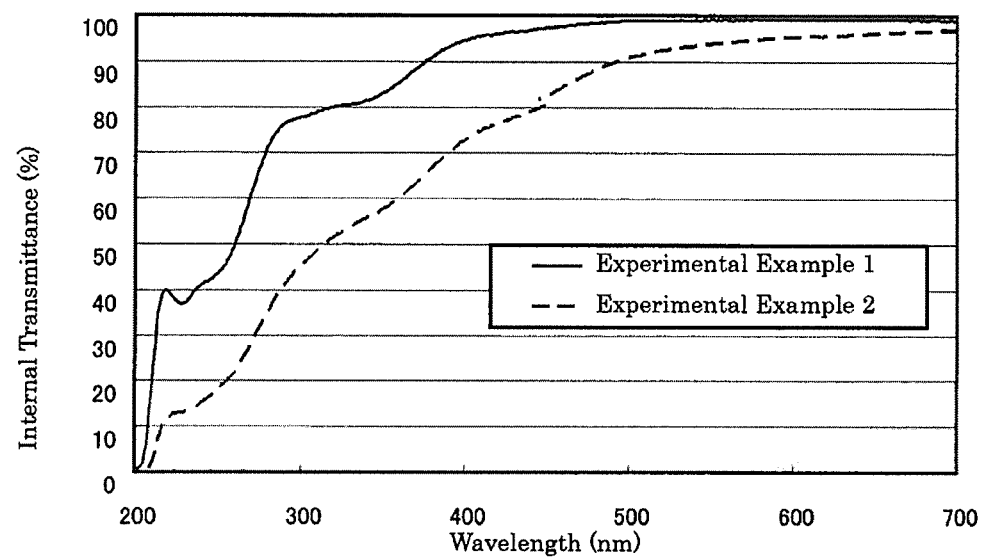
FIG. 1 is a graph showing results of Experimental Examples 1 and 2.

10: a laser excitation device, 12: xenon flash lamps, 13: silica glass tubes, 14: an Nd:YAG laser rod, 16: an elliptical mirror, 20: a laser cavity, 22: a reflecting concave mirror, 24: a half mirror, 26: a power meter.

BEST MODE FOR CARRYING OUT THE INVENTION

Hereinafter, embodiments of the present invention will be described. It is needless to say that the embodiments are illustrative and can be modified in various ways without departing from the technical idea of the present invention.

A copper-containing silica glass of the present invention is capable of suppressing a copper cluster formation, contains copper of from 5 wtppm to 200 wtppm, and emits fluorescence having a peak in a wavelength range of from 520 nm to 580 nm under irradiation of ultraviolet light with a wavelength ranging from 160 nm to 400 nm, wherein an internal transmittance of the copper-containing silica glass per 2.5 mm thickness at a wavelength of 530 nm is 95% or more.

In the copper-containing silica glass, a main factor of decreasing a transmittance of visible light region is in that doped copper generates clusters in the glass, resulting in absorption and scattering of light. Further, the resulting minute clusters generated in the glass are energetically unstable so that the clusters are associated by light irradiation or heat. That is, when the glass is used as a lamp, minute clusters which have limited contribution to scattering theretofore grow by association caused by light or heat from the lamp, which causes decreasing translucency additionally. Moreover, the differences of the expansion coefficients between the silica glass and the clusters may cause distortion to the glass, so that the glass may be broken in the end.

A method for producing the copper-containing silica glass and more specifically, an atmosphere for vitrification exert an effect on whether the clusters are generated in the copper-containing silica glass or not. When the glass is vitrified under a weak reducing atmosphere, cluster generation can be effectively suppressed. The cause of cluster generation and the reason why cluster generation can be suppressed by vitrifying under a weak reducing atmosphere are considered as follows.

Copper may have oxidation numbers of metal copper of zero-valence and copper ions of divalence or monovalence. Divalent copper ions must have two-coordinate formation with silica networks such as Si$^-$O$^-$Cu$^{2+}$-O$^-$Si in order to exist in the silica network stably. In order to be such formation, two Si$^-$O$^-$ must exist in close proximity to Cu$^{2+}$. However, a silica glass network is inherently neutral and such Si—O$^-$ structure is difficult to exist numerously. For this reason, divalent copper ions which cannot coordinate with the silica network form CuO clusters in the silica glass. Such clusters decrease translucency of the glass, the transmittance thereof being deteriorated. Also, the clusters associate with each other by light irradiation or heat so that translucency of the glass may not only be further deteriorated, but also the glass may be broken.

The same phenomena may happen as to metal copper in the silica glass. The metal copper is neutral and cannot coordinate with the silica network so that metal copper clusters are formed, translucency of the silica glass being deteriorated.

Also, the phenomena that clusters associate with each other and grow may similarly happen as to the metal copper in the silica glass.

On the other hand, monovalent copper coordinates with only one Si—O$^-$ and can exist stably in a silica glass. Therefore, even when monovalent copper is doped at a high concentration, cluster generation is suppressed, the visible light transmittance being hardly deteriorated.

For the above reasons, when a silica glass is produced under the condition such that doped copper is monovalent, the obtained copper-containing silica glass may suppress cluster generation.

Clusters can be observed by a scanning electron microscope depending on the cluster size; however, only the clusters in the vicinity of the silica glass surface were observed with the scanning electron microscope. As a result of intensive researches, the present inventors found that the degrees of absorption and scattering caused by the clusters can be got in the glass thickness direction on average by measuring the visible light transmittance to detect the presence of the clusters.

FIG. 1 is a graph showing the results of Experimental Examples 1 and 2 described later. The graph of FIG. 1 shows internal transmittance spectra per 2.5 mm thickness of the copper-containing silica glasses produced in Experimental Examples 1 and 2.

In Experimental Example 1, a copper-containing silica glass in which cluster generation is suppressed was examined. In Experimental Example 2A, a copper-containing silica glass in which clusters is generated was examined. As shown in FIG. 1, the internal transmittance of the glass of Experimental Example 1 where cluster generation is suppressed shows high translucency in a wavelength region of 500 nm or more, whereas the glass of Experimental Example 2 in which clusters were generated, shows transmission loss in a wavelength region of 500 nm or more. When the degree of cluster size is distinguished by the transmittance, as can be seen from FIG. 1, in the wavelength region shorter than 500 nm, it is difficult to distinguish the degree of cluster size because the absorption due to the clusters is overlapped with the one due to copper doping. Therefore, it was found out that it is better to estimate the internal transmittance of the silica glass at a wavelength region of 500 nm or more, and further it is best for application of the present invention to estimate the one at a wavelength of 530 nm, which is an absorption peak wavelength of an Nd:YAG laser.

An internal transmittance of the silica glass at a wavelength of 530 nm per 2.5 mm thickness is necessarily 95% or more. If the internal transmittance of the silica glass is lower than 95%, the silica glass not only cannot transmit light required for exciting an Nd:YAG laser, but also, when the silica glass is used as a lamp, with heat and light of the lamp association of the copper clusters in the glass is generated so that the transmittance is further deteriorated. If association of the clusters is further generated, the distortion due to the association the glass may be broken (see Comparative Example 2). Therefore, the internal transmittance of the glass per 2.5 mm thickness is necessarily 95% or more, more preferably of from 97% to 99.9%.

A concentration of copper to be doped in the silica glass is necessarily of from 5 wtppm to 200 wtppm. In case of the copper concentration being too low, fluorescent intensity becomes weak and excitation efficiency is hardly improved; therefore, the silica glass necessarily contains copper of 5 wtppm or more. Patent Document 3 describes that a copper concentration in the silica glass is necessarily 30 wtppm or more. In the present invention, the visible light transmittance of the silica glass has been improved and a producing condition thereof is different from Patent Document 3 because the silica glass of the present invention contains a lot of monovalent copper, so according to the present invention the silica glass containing copper of 5 wtppm or more can achieve the purpose. When the copper concentration of the silica glass is extremely high, even if the producing condition is controlled, cluster generation cannot be suppressed; the copper concentration of the silica glass of the present invention is necessarily 200 wtppm or less. The copper concentration of the silica glass is more preferably 150 wtppm or less, because in the range of the said copper concentration cluster generation can be suppressed nearly completely.

In the copper-containing silica glass of the present invention, it is preferable that the total cross-sectional area of bubbles each having a diameter of 0.08 mm or more which are contained in 100 cm$^3$ thereof is 0.1 mm$^2$ or less. Since the copper-containing silica glass of the present invention contains copper, bubbles are more easily generated compared to a normal silica glass depending on the producing process. When there are a large number of bubbles, the glass may start to be broken at bubbles by heat generated during lighting a lamp, so the less the bubbles the more preferable the glass. Specifically, in a testing method according to DIN 58927, the total cross-sectional area of bubbles each having a diameter of 0.08 mm or more which are contained in 100 cm$^3$ thereof is preferably 0.1 mm$^2$ or less, because break of the glass due to bubbles is hardly happened. The total cross-sectional area of bubbles is more preferably 0.03 mm$^2$ or less.

According to the copper-containing silica glass of the present invention, viscosity log$\eta$ at a temperature of 1,280° C. is preferably of from 11 to 12.5. The copper-containing silica glass of the present invention has a tendency such that viscosity is lower than that of the normal silica glass due to the contained copper. When viscosity is too low, the glass is deformed and a lamp is broken by heat generated during lighting the lamp. To avoid the deformation and break, viscosity log at a temperature of 1,280° C. is preferably 11 or more. According to the copper-containing silica glass of the present invention, the higher the copper concentration or the OH group concentration, the lower the viscosity; therefore, it is preferable to control the copper concentration and the OH concentration not to be extremely high. The upper limit of the viscosity is 12.5 which is a viscosity value of a usual silica glass with high heat resistance.

According to the copper-containing silica glass of the present invention, it is preferable that each of concentrations of Na, K, Mg, Ca and Al is less than 1 wtppm. These impurities extremely accelerate glass crystallization which is called devitrification. For this reason, when a large amount of the impurities is contained therein, devitrification occurs by heat generated during lighting a lamp to break the lamp. Therefore, it is preferable that each of the concentrations of Na, K, Mg, Ca and Al is less than 1 wtppm, more preferably less than 0.1 wtppm. In the later concentration, no devitrification occurs by impurities.

For producing the copper-containing silica glass of the present invention, reagents with few impurities are preferably used.

According to the copper-containing silica glass of the present invention, the OH group concentration is preferably of from 0.1 wtppm to 500 wtppm. When the OH group concentration is less than 0.1 wtppm, a fluorescent peak wavelength of the silica glass is around 490 nm, which cannot contribute to excite an Nd:YAG laser thoroughly. In addition, when the OH group concentration is over 500 wtppm, a fluorescent peak wavelength thereof is around 500 nm, which does not make an enough contribution to excite an Nd:YAG laser. Therefore, the OH group concentration is preferably 500 wtppm or less.

As a method for producing the copper-containing silica glass of the present invention, there can be used, for example, an electric melting method in which copper compounds and SiO2 powder are mixed to make a mixture and the mixture is fused and vitrified in an electric melting furnace, a Verneuil method in which a mixture of copper compounds and SiO2 powder are introduced into an oxyhydrogen burner flame with a high temperature to fuse the mixture and the fused mixture is deposited onto a target, a direct method in which slicon compounds and copper compounds are introduced into an oxyhydrogen burner flame with a high temperature to fuse and deposit onto a target, a soot method in which silicon compounds and copper compounds are introduced into an oxyhydrogen burner flame to deposit the resultant copper-containing silica fine particles onto a target, followed by vitrifying them in an electric furnace, a stuffing method in which silica compounds are introduced into an oxyhydrogen burner flame to deposit the resultant silica particles on a target, the resultant silica particle deposited body is immersed in a copper-containing solution to introduce copper therein, the resultant copper-containing silica particle deposited body is dried, and after that the dried resultant body is vitrified in an electric furnace. In particular, the stuffing method is preferable because in the method bubbles and impurities can be suppressed, a copper concentration is easily adjustable and a vitrifying atmosphere is easily controlled.

The stuffing method which is preferably used for producing the copper-containing silica glass of the present invention is described more particularly. The stuffing method is a method for producing a copper-containing silica glass comprising the following steps:

a) depositing silica particles produced by hydrolyzing silicon compounds with an oxyhydrogen flame to obtain a silica porous body, b) immersing the silica porous body obtained in the step a) in a solution containing copper ions, keeping it for a predetermined time, and then removing it from the solution, followed by drying it, and c) vitrifying the dried silica porous body under a weak reducing atmosphere at a temperature ranging from 1,350° C. to 1,600° C.

In the method for producing the copper-containing silica glass of the present invention, it is particularly preferable to vitrify the silica porous body under a weak reducing atmosphere in the step c), whereby the copper-containing silica glass which is excellent in the visible transmittance can be obtained. The weak reducing atmosphere in the present invention includes a vacuum atmosphere in a graphite furnace or a mixed gas atmosphere of a reducing gas and an inert gas the reducing gas being of 5 vol % or less, more preferably of from 0.01 vol % to 5 vol %. As the reducing gas, hydrogen, carbon monoxide, etc. may be used. When carbon monoxide is used, carbon (C) may remain in the glass to thereby reduce the transmittance thereof, whereas when hydrogen is used as the reducing gas, no residues are left in the glass; hydrogen is preferably used as the reducing gas.

When a mixed gas atmosphere of hydrogen and an inert gas is used, a hydrogen concentration is appropriately adjusted depending on a size of a soot body to be vitrified, a vitrification temperature and so on. When the hydrogen ratio is extremely high, the reducing capacity is so strong that clusters are easily generated in the glass; a hydrogen concentration is preferably 5 vol % or less, and more preferably 3 vol % or less because the glass is difficult to be reduced. In addition, a hydrogen concentration in the mixed gas atmosphere is preferably 0.01 vol % or more. A total pressure of the mixed gas is not specifically limited; the total pressure of from 0.1 MPa to 0.2 MPa is easy to handle. As an inert gas, rare gas elements and nitrogen gas may be used.

When a silica particle deposited body is fused under a vacuum atmosphere in a graphite furnace, water ($H_2O$) desorbing from the silica particle deposited body reacts with a graphite member (C), that is $H_2O+C \rightarrow H_2+CO$, so the atmosphere in the furnace becomes a weak reducing atmosphere. Herein, the vacuum atmosphere is an atmosphere of 10 KPa or less, which is sufficient to achieve the purpose.

The silicon compounds used in the step (a) are not especially limited as long as those react with water resulted from burning of oxygen and hydrogen to generate silica ($SiO_2$); particularly, examples of those include silicon tetrachloride, tetraethoxysilane, trimethylmethoxysilane and the like.

The silica porous body produced in the step a) may be produced by any of a VAD method and an OVD method. The glass produced by the VAD method requires a drilling process to make a glass tube; therefore, the OVD method which does not need a drilling process is more preferable because of simplification of the procedures.

In the step b), the solution containing copper ions is produced by dissolving a proper copper salt in a solvent. As the copper salt, there can be used copper (II) chloride, copper (II) sulfate, copper (II) nitrate, copper (II) acetate, etc., which are soluble to a solvent to be used. The valence number of copper to be used is not specially limited and any of monovalent copper and divalent copper may be used. The solvent to be used is not specially limited as long as the solvent can solve the salt to be used; however, pure water, alcohol, etc. are preferable from economic and handling aspects.

In the step b), the time for immersing the silica porous body in the solution is adjusted suitably depending on the size, shape and density thereof; it is preferable to immerse it for 4 hours or more with the object of the solution being sufficiently penetrated. Moreover, the longer immersing time causes no technical problems; however, the immersion for 200 hours is enough in view of production efficiency. As to a temperature of the silica porous body when immersing it into the solution, any temperature is applicable unless the body has a very low temperature such that the solvent is solidified or a very high temperature such that the solvent is extremely evaporated; specifically, the temperature is preferably 5° C. or higher and less than 40° C.

Subsequent to the step b), adding an unstuffing step is also effective. The unstuffing step is the step wherein the silica porous body which is immersed in the copper ion containing solution and taken out therefrom is immersed in a copper ion-free solvent. Application of this step can adjust the concentration of the copper which is introduced in the stuffing step and the concentration distribution thereof. The solvent in the unstuffing step is preferably the same solvent as the one used in the solution of the stuffing step. The time for unstuffing treatment is adjusted appropriately depending on the size, shape, density of the silica porous body. For example, when only the copper concentration in the vicinity of the surface is to be decreased by unstuffing, the time may be about 10 minutes for the purpose. The immersing time may be prolonged; but the immersion for 200 hours is enough in view of production efficiency. As to the temperature of the silica porous body when immersing into the solution, any temperature is applicable unless the body has a very low temperature such that the solvent is solidified or a very high temperature such that the solvent is extremely evaporated; specifically, the temperature is preferably 5° C. or higher and less than 40° C.

In addition, before the step c), a heating step is effectively added for heating the silica porous body at a temperature of from 900° C. to 1,250° C., whereby bubbles can be reduced more effectively after vitrification. A heating atmosphere is not specifically limited; however, when heating the silica porous body under a very strong oxidative atmosphere represented by a 100% oxygen atmosphere, or under a very strong reductive atmosphere represented by 100% hydrogen, it may not be possible to control copper valence by only controlling the atmosphere in the vitrification step subsequent to the heating step. Therefore, it is preferable to treat the silica porous body under an atmosphere which is not extremely strong oxidative or reductive. More particularly, nitrogen, Ar, He atmospheres, a vacuum atmosphere, etc. are preferable for the purpose. A vacuum atmosphere in a graphite furnace is weakly reductive and may be used sufficiently.

In the step c), a temperature for transparent vitrification is preferably of from 1,350° C. to 1,600° C. At a temperature of lower than 1,350° C., the glass is not fully transparentized to generate portions which are not fused. Therefore, a vitrification temperature is preferably 1,350° C. or higher and more preferably 1,400° C. or higher; at the later temperature there are almost no portions which are not fused due to a low temperature. When vitrification is performed at a temperature of higher than 1,600° C., the glass is extremely deformed; therefore the vitrification temperature is preferably 1,600° C. or lower and more preferably 1,550° C. or lower.

EXAMPLES

Hereinafter, the present invention will be described more specifically by way of examples. However, it should be appreciated that these examples are shown for illustrative purposes, and should not be interpreted in a limiting manner.

Example 1

Silicon tetrachloride was introduced into an oxyhydrogen flame to produce silica particles, then the silica particles were deposited onto a rotating target, and thereby a silica porous body having an outside diameter of 250 mm, an inside diameter of 100 mm and a length of 800mm was produced. The silica porous body was removed from the target, and then immersed in a copper (II) chloride solution having a copper (II) chloride concentration of 20 mg/L in which copper (II) chloride with purity of 99.999% was dissolved into pure water and was allowed to stand at a temperature of 25° C. for 100 hours, whereby copper doping operation was performed. Next, the silica porous body was taken out from the copper (II) chloride solution, and was dried in dry air at a temperature of 90° C. for 100 hours. After drying, the dried silica porous body was immersed into pure water and was allowed to stand at a temperature of 25° C. for 24 hours, the copper concentration having been averaged (unstuffing). Then, the silica porous body was taken out from pure water, and was dried in dry air at a temperature of 90° C. for 100 hours.

The dried silica porous body was placed in a graphite furnace, and was heated in an $N_2$ stream at a temperature of 1,100° C. for 12 hours to densify the silica porous body. Then, after evacuating the gas in the furnace to produce a vacuum, the silica porous body was heated in the vacuum atmosphere at a temperature of 1,500° C. for 4 hours to be vitrified, whereby a cylindrical copper-doped silica grass having an outside diameter of 200 mm, an inside diameter of 100 mm and a length of 600 mm was obtained. The resultant copper-doped silica glass was placed in an electric furnace for extending, then extended and cut to produce a copper-doped silica glass tubes each having an outside diameter of 20 mm, a thickness of 2.5 mm and a length of 250 mm.

As a result of measuring a metal concentration contained in the silica glass tubes by an ICP-AES method, the copper concentration was 50 wtppm, and each of the concentrations of Na, K, Mg, Ca and Al is less than the detection lower limit of 0.05 wtppm. Then the glass tube was cut into a semicylindrical test piece. Measuring an OH group concentration of the test piece from an absorbance at 2.7 μm by using an FT-IR method, the result of the measurement showed that the concentration was 100 ppm. Measuring an internal transmittance per 2.5 mm thickness of the test piece at a wavelength of 530 nm by a spectrophotometer, the internal transmittance was 99.0%. The total cross-sectional area of bubbles each having a diameter of 0.08 mm or more which had been contained in 100 $cm^3$ thereof was 0.03 $mm^2$. Measuring viscosity thereof by a beam bending method, the viscosity logo at a temperature of 1,280° C. was 11.5. The results are shown in Table 1.

TABLE 1

| | Copper Concentration (wtppm) | Internal Transmittance (%) | Total Cross-Sectional Area of Bubbles ($mm^2$) | Viscosity log η | Impurity Concentrations (wtppm) | | | | | OH group Concentration (ppm) |
|---|---|---|---|---|---|---|---|---|---|---|
| | | | | | Na | K | Mg | Ca | Al | |
| Example 1 | 50 | 99.0 | 0.03 | 11.5 | less than 0.05 | less than 0.05 | less than 0.05 | less than 0.05 | less than 0.05 | 100 |
| Example 2 | 10 | 99.5 | 0.01 | 11.6 | less than 0.05 | less than 0.05 | less than 0.05 | less than 0.05 | less than 0.05 | 100 |
| Example 3 | 150 | 96.5 | 0.05 | 11.3 | less than 0.05 | less than 0.05 | less than 0.05 | less than 0.05 | less than 0.05 | 100 |
| Example 4 | 50 | 99.0 | 0.01 | 11.7 | less than 0.05 | less than 0.05 | less than 0.05 | less than 0.05 | less than 0.05 | 10 |
| Example 5 | 50 | 98.5 | 0.05 | 11.5 | less than 0.05 | less than 0.05 | less than 0.05 | less than 0.05 | less than 0.05 | 130 |
| Comparative Example 1 | less than 0.05 | 99.9 | 0.01 | 11.7 | less than 0.05 | less than 0.05 | less than 0.05 | less than 0.05 | less than 0.05 | 100 |
| Comparative Example 2 | 400 | 90.0 | 0.5 | 10.7 | 2 | 1 | 1 | 1 | 2 | 100 |
| Comparative Example 3 | 50 | 93.0 | 0.08 | 11.5 | less than 0.05 | less than 0.05 | less than 0.05 | less than 0.05 | less than 0.05 | 50 |
| Comparative Example 4 | 50 | 91.0 | 0.05 | 11.5 | less than 0.05 | less than 0.05 | less than 0.05 | less than 0.05 | less than 0.05 | 140 |

Figure 2:
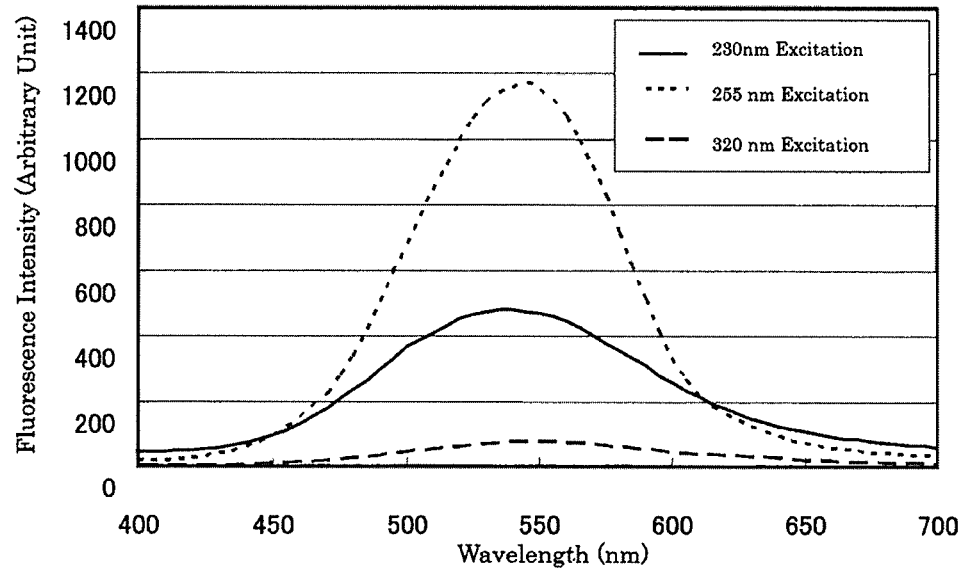
FIG. 2 is a graph showing results of fluorescence spectra of Inventive Example 1.

Fluorescence spectra of the obtained copper-doped silica glass tube were shown in FIG. 2. At any of excitation wavelengths of 230 nm, 255 nm and 320 nm, fluorescence having a peak around 540 nm appeared.

With the obtained six (6) copper doped silica glass tubes, six (6) xenon flash lamps each having light emitting portion which has an outside diameter of 20 mm and a length of 200 mm were produced. Using these xenon flash lamps, an Nd:YAG rod having an outside diameter of 10 mm, a length of 150 mm and an Nd concentration of 1.1% was excited to examine the laser oscillation characteristics thereof.

Figure 3:
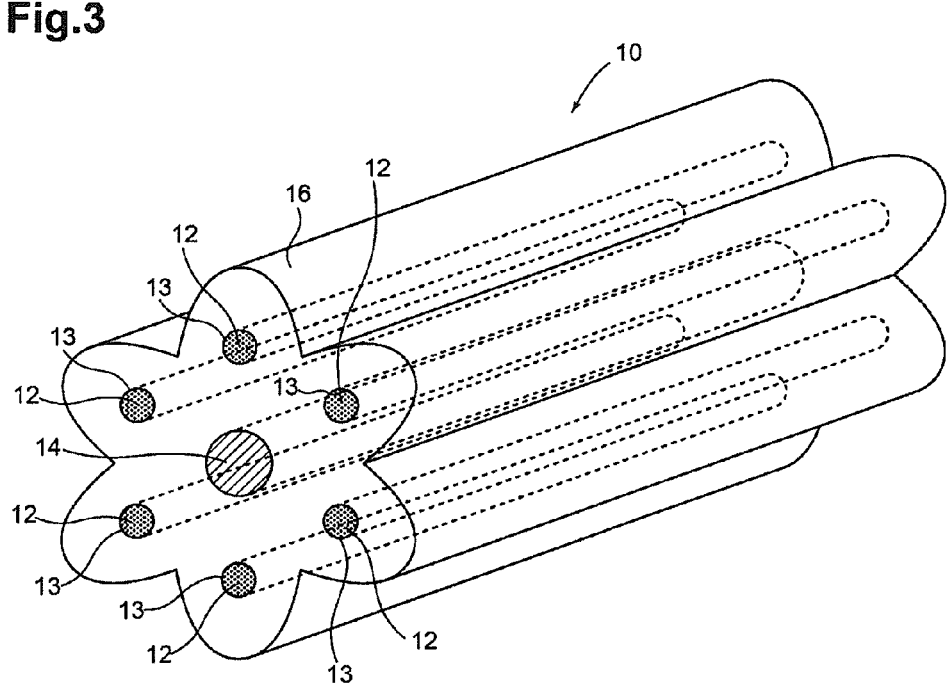
FIG. 3 is a perspective view with a cross-sectional part showing an Nd:YAG laser excitation device used in Inventive Example 1.

A partially cross-sectional perspective explanatory view of an Nd:YAG laser excitation device used in Example 1 is shown in FIG. 3. In FIG. 3, a reference numeral 10 denotes a laser excitation device, which comprises six (6) xenon flash lamps 12 composed of six (6) silica glass tubes 13, an Nd:YAG laser rod 14 and an elliptical mirror 16.

Figure 4:
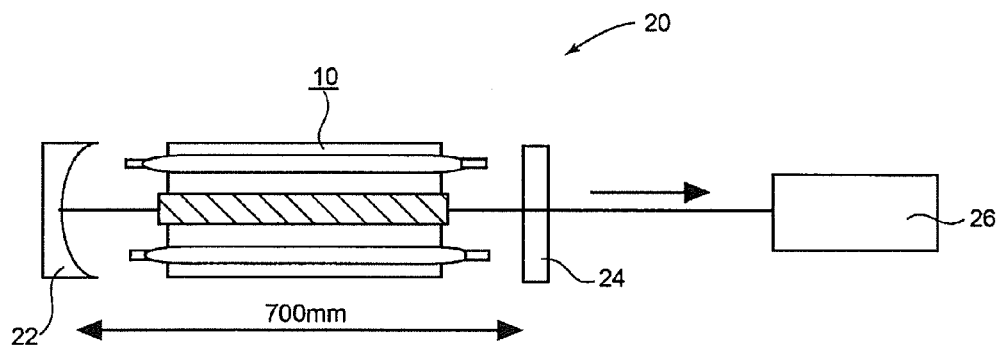
FIG. 4 is a schematic view showing a laser characteristic measuring device used in Inventive Example 1.

FIG. 4 is a schematic explanatory view of a measuring device for laser oscillation characteristics. In FIG. 4, a reference numeral 20 denotes a laser cavity having a length of 700 mm, which comprises a partially reflecting mirror (a half mirror) 24 with reflectance of 70% and a reflecting concave mirror 22 with reflectance of 99.5%.

As shown in FIG. 4, the laser excitation device 10 of FIG. 3 was placed in the laser cavity 20 to oscillate laser by exciting an Nd:YAG rod with xenon flash lamps, followed by measuring strength of the laser light by a power meter 26. A lighting frequency of the flash lamp was set to 50 Hz and laser strengths after 1 hour and 50 hours from start of laser oscillation were measured, respectively. The results were shown in Table 2.

TABLE 2

| | After 1 hour | | | After 50 hours | | |
|---|---|---|---|---|---|---|
| | Input Energy (J) | Output Energy (J) | Efficiency | Input Energy (J) | Output Energy (J) | Efficiency |
| Comparative Example 1 | 600 | 7.1 | 1.00 | 600 | 7.0 | 1.00 |
| Example 1 | 600 | 16.0 | 2.25 | 600 | 15.7 | 2.24 |
| Example 2 | 600 | 10.4 | 1.46 | 600 | 10.2 | 1.46 |
| Example 3 | 600 | 19.2 | 2.70 | 600 | 18.7 | 2.67 |
| Example 4 | 600 | 15.1 | 2.13 | 600 | 14.8 | 2.11 |
| Example 5 | 600 | 14.0 | 1.97 | 600 | 13.6 | 1.94 |
| Comparative Example 2 | 600 | 20.2 | 2.85 | 600 | Damaged | — |
| Comparative Example 3 | 600 | 11.9 | 1.68 | 600 | 5.3 | 0.76 |
| Comparative Example 4 | 600 | 10.2 | 1.44 | 600 | 4.7 | 0.67 |

Efficiency in Table 2 shows respective values after 1 hour and 50 hours from start of laser oscillation which are given by dividing each value of output energy of Examples and Comparative Examples by the corresponding value of output energy of Comparative Example 1. In the present specification, the sum of electric energy supplied to the six (6) flash lamps is referred to as input energy and laser light energy measured by a power meter is referred to as output energy.

As shown in Table 2, when a flash lamp produced by the copper doped silica glass of Example 1 was used, clearly higher output energy was observed as compared to when a flash lamp produced by the copper-free silica glass of Comparative Example 1 was used. Efficiency in Example 1 after 1 hour from start of laser oscillation was 2.25 times than that in Comparative Example 1 and efficiency in Example 1 after 50 hours from start of laser oscillation was 2.24 times than that in Comparative Example 1; the efficiency is little decreased and high laser oscillation efficiency was sustained.

Next, the above-mentioned flash lamp used for laser oscillation of 50 hours was taken out and the shape and color thereof were observed. As a result of observation, the lamp tube had no specific changes compared to before the use for laser oscillation. In addition, the lamp tube of the flash lamp used for the laser oscillation was cut to measure a visible light transmittance per 2.5 mm thickness. The internal transmittance at a wavelength of 530 nm was 98.5%; the reduction of the visible light transmittance was very little.

Comparative Example 1

A silica porous body produced in the same way as in Example 1 was dried, densified and vitrified in the same way as in Example 1 except that copper doping and unstuffing were not performed to obtain a cylindrical silica glass having an outside diameter of 200 mm, an inside diameter of 100 mm and a length of 600 mm.

The silica glass was extended and cut in the same way as in Example 1 to produce silica glass tubes each having an outside diameter 5 of 20 mm, a thickness of 2.5 mm and a length of 250 mm.

As a result of measuring a metal concentration contained in the silica glass tubes, each of the concentrations of Cu, Na, K, Mg, Ca and Al was less than 0.05 wtppm. The OH group concentration thereof was 100 ppm. The internal transmittance per 2.5 mm thickness at a wavelength of 530 nm was 99.9%. The total cross-sectional area of bubbles each having a diameter of 0.08 mm or more which had been contained in 100 cm$^3$ thereof was 0.01 mm$^2$, and viscosity logo at a temperature of 1,280° C. was 11.7 . The results are shown in Table 1.

With the obtained silica glass tubes, xenon flash lamps which had the same size as in Example 1 were produced. Using these xenon flash lamps, an Nd:YAG laser was excited to examine the characteristics in the same way as in Example 1 . The differences of excitation efficiency were compared to each of Examples. The results are shown in Table 2.

Example 2

A cylindrical copper-doped silica glass having an outside diameter of 200 mm, an inside diameter of 100 mm and a length of 600 mm was obtained under the same conditions as in Example 1 except that a copper (II) chloride concentration in a copper (II) chloride solution was set to 4 mg/L when copper was doped.

The copper-doped silica glass was extended and cut in the same way as in Example 1 to produce copper-doped silica glass tubes each having an outside diameter of 20 mm, a thickness of 2.5 mm, and a length of 250 mm.

A copper concentration contained in the silica glass tube was 10 wtppm, each of the concentrations of Na, K, Mg, Ca and Al was less than 0.05 wtppm. The OH group concentration was 100 ppm. The internal transmittance per 2.5 mm thickness at a wavelength of 530 nm was 99.5%. The total cross-sectional area of bubbles each having a diameter of 0.08 mm or more which had been contained in 100 cm$^3$ thereof was 0.01 mm$^2$, and viscosity log at a temperature of 1,280° C. was 11.6 . The results are shown in Table 1.

With the obtained six (6) copper doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

As shown in Table 2, when the flash lamp was used, efficiency in Example 2 after 1 hour from start of laser oscillation was 1.46 times than that in Comparative Example 1 and efficiency in Example 2 after 50 hours from start of laser oscillation was 1.46 times than that in Comparative Example 1; high laser oscillation efficiency in Example 2 was sustained compared to the flash lamp of Comparative Example 1.

Next, the above-mentioned flash lamp used for laser oscillation of 50 hours was taken out and the shape and color thereof were observed. As a result of observation, the lamp tube had no specific changes compared to before the use for laser oscillation. In addition, the lamp tube of the flash lamp used for the laser oscillation was cut to measure a visible light transmittance per 2.5 mm thickness. The internal transmittance at a wavelength of 530 nm was 99.2%; the reduction of the visible light transmittance was very little.

Example 3

A cylindrical copper-doped silica glass having an outside diameter of 200 mm, an inside diameter of 100 mm and a length of 600 mm was obtained under the same conditions as in Example 1 except that a copper (II) chloride concentration in a copper (II) chloride solution was set to 60 mg/L when copper was doped.

The copper-doped silica glass was extended and cut in the same way as in Example 1 to produce copper-doped silica glass tubes each having an outside diameter of 20 mm, a thickness of 2.5 mm, and a length of 250 mm.

A copper concentration contained in the silica glass tube was 150 wtppm, each of the concentrations of Na, K, Mg, Ca and Al was less than 0.05 wtppm. The OH group concentration was 100 ppm. The internal transmittance per 2.5 mm thickness at a wavelength of 530 nm was 96.5%. The total cross-sectional area of bubbles each having a diameter of 0.08 mm or more which had been contained in 100 cm$^3$ thereof was 0.05 mm$^2$, and viscosity log$\eta$ at a temperature of 1,280° C. was 11.3. The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

As shown in Table 2, when the flash lamp was used, efficiency in Example 3 after 1 hour from start of laser oscillation was 2.7 times than that in Comparative Example 1 and efficiency in Example 3 after 50 hours from start of laser oscillation was 2.67 times than that in Comparative Example 1; high laser oscillation efficiency in Example 3 was sustained compared to the flash lamp of Comparative Example 1.

Next, the above-mentioned flash lamp used for laser oscillation of 50 hours was taken out and the shape and color thereof were observed. As a result of observation, the lamp tube had no specific changes compared to before the use for laser oscillation. In addition, the lamp tube of the flash lamp used for the laser oscillation was cut to measure a visible light transmittance per 2.5 mm thickness. The internal transmittance at a wavelength of 530 nm was 95.5%; the reduction of the visible light transmittance was little.

Example 4

A cylindrical copper-doped silica glass having an outside diameter of 200 mm, an inside diameter of 100 mm and a length of 600 mm was obtained under the same conditions as in Example 1 except that a heating time in a N$_2$ stream was 120 hours.

The copper-doped silica glass was extended and cut in the same way as in Example 1 to produce copper-doped silica glass tubes each having an outside diameter of 20 mm, a thickness of 2.5 mm and a length of 250 mm.

A copper concentration contained in the silica glass tube was 50 wtppm, each of the concentrations of Na, K, Mg, Ca and Al was less than the detection lower limit of 0.05 wtppm. The OH group concentration was 10 ppm. The internal transmittance per 2.5 mm thickness at a wavelength of 530 nm was 99.0%. The total cross-sectional area of bubbles each having a diameter of 0.08 mm or more which had been contained in 100 cm$^3$ thereof was 0.01 mm$^2$, and viscosity log$\eta$ at a temperature of 1,280° C. was 11.7. The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

As shown in Table 2, when the flash lamp was used, efficiency in Example 4 after 1 hour from start of laser oscillation was 2.13 times than that in Comparative Example 1 and efficiency in Example 4 after 50 hours from start of laser oscillation was 2.11 times than that in Comparative Example 1; high laser oscillation efficiency in Example 4 was sustained compared to the flash lamp of Comparative Example 1.

Next, the above-mentioned flash lamp used for laser oscillation of 50 hours was taken out and the shape and color thereof were observed. As a result of observation, the lamp tube had no specific changes compared to before the use for laser oscillation. In addition, the lamp tube of the flash lamp used for the laser oscillation was cut to measure a visible light transmittance per 2.5 mm thickness. The internal transmittance at a wavelength of 530 nm was 98.3%; the reduction of the visible light transmittance was little.

Example 5

A silica porous body was produced and doped by copper, followed by performing unstuffing thereto under the same conditions as in Example 1. The silica porous body was placed in a heating furnace in which a silica glass was used as a furnace core tube, and then the silica porous body was heated in a N$_2$ stream at a temperature of 1,100° C. for 12 hours to densify it. After that, an atmosphere of the furnace was substituted with a hydrogen/helium mixed gas atmosphere of H$_2$/He=3/97, followed by heating it at a temperature of 1,500° C. for 4 hours to vitrify, whereby a cylindrical copper-doped silica glass having an outside diameter of 200 mm, an inside diameter of 100 mm and a length of 600 mm was obtained.

The copper-doped silica glass was extended and cut in the same way as in Example 1 to produce copper-doped silica glass tubes each having an outside diameter of 20 mm, a thickness of 2.5 mm and a length of 250 mm.

A copper concentration contained in the silica glass tube was 50 wtppm, each of the concentrations of Na, K, Mg, Ca and Al was less than the detection lower limit of 0.05 wtppm. The OH group concentration was 130 ppm. The internal transmittance per 2.5 mm thickness at a wavelength of 530 nm was 98.5%. The total cross-sectional area of bubbles each having a diameter of 0.08 mm or more which had been contained in 100 cm³ of the silica glass was 0.05 mm², and viscosity log η at a temperature of 1,280° C. was 11.5. The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

As shown in Table 2, when the flash lamp was used, efficiency in Example 5 after 1 hour from start of laser oscillation was 1.97 times than that in Comparative Example 1 and efficiency in Example 5 after 50 hours from start of laser oscillation was 1.94 times than that in Comparative Example 1; high laser oscillation efficiency in Example 5 was sustained compared to the flash lamp of Comparative Example 1.

Next, the above-mentioned flash lamp used for laser oscillation of 50 hours was taken out and the shape and color thereof were observed. As a result of observation, the lamp tube had no specific changes compared to before the use for laser oscillation. In addition, the lamp tube of the flash lamp used for the laser oscillation was cut to measure a visible light transmittance per 2.5 mm thickness. The internal transmittance at a wavelength of 530 nm was 97.8%; the reduction of the visible light transmittance was little.

Comparative Example 2

A cylindrical copper-doped silica glass having an outside diameter of 200 mm, an inside diameter of 100 mm and a length of 600 mm was obtained under the same condition as in Example 1 except that purity of copper (II) chloride which was used for adjusting a copper (II) chloride solution was 97.0% when copper was doped and that a copper (II) chloride concentration of the solution was 200 mg/L.

The copper-doped silica glass was extended and cut in the same way as in Example 1 to produce copper-doped silica glass tubes each having an outside diameter of 20 mm, a thickness of 2.5 mm and a length of 250 mm.

A copper concentration contained in the silica glass tube was 400 wtppm, each of the concentrations of Na and Al was 2 wtppm, and each of the concentrations of K, Mg and Ca was 1 wtppm. The OH group concentration was 100 ppm. The internal transmittance per 2.5 mm thickness at a wavelength of 530 nm was 90.0%. The total cross-sectional area of bubbles each having a diameter of 0.08 mm or more which had been contained in 100 cm³ thereof was 0.50 mm², and viscosity log η at a temperature of 1,280° C. was 10.7. The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

When the flash lamp was used, efficiency after 1 hour from start of laser oscillation was 2.85 times, which was higher compared to the use of the flash lamp of Comparative Example 1. However, after 30 hours from start of laser oscillation, the lamp tube of the flash lamp was damaged.

As a result of observing the damaged lamp tube, the tube was deformed by heat and crystallization had occurred in spots. Observing the fractured surface of the lamp, it was found out that cracks had occurred from a bubble portion and a crystallized portion as starting points.

Further, the tube itself was colored to brown. As a result of measuring the visible light transmittance per 2.5 mm thickness, the internal transmittance at a wavelength of 530 nm was 63.0%; it is found out that the visible light transmittance is heavily reduced. Thus, it is found out that this copper-doped silica glass has extremely inferior in long term stability.

Comparative Example 3

A silica porous body was produced and doped by copper, followed by performing unstuffing thereto under the same conditions as in Example 1. The silica porous body was placed in a heating furnace in which a silica glass was used as a furnace core tube, and then it was heated in a $N_2$ stream at a temperature of 1,100° C. for 12 hours to densify the silica porous body. After that, an atmosphere of the furnace was substituted with an oxygen atmosphere, followed by heating it at a temperature of 1,500° C. for 4 hours to vitrify, whereby a cylindrical copper-doped silica glass having an outside diameter of 200 mm, an inside diameter of 100 mm and a length of 600 mm was obtained.

The copper-doped silica glass was extended and cut in the same way as in Example 1 to produce copper-doped silica glass tubes each having an outside diameter of 20 mm, a thickness of 2.5 mm and a length of 250 mm.

A copper concentration contained in the silica glass tube was 50 wtppm, each of the concentrations of Na, K, Mg, Ca and Al was less than the detection lower limit of 0.05 wtppm. The OH group concentration was 50 ppm. The internal transmittance per 2.5 mm thickness at a wavelength of 530 nm was 93.0%. The total cross-sectional area of bubbles each having a diameter of 0.08 mm or more which had been contained in 100 cm³ thereof was 0.08 mm², and viscosity log η at a temperature of 1,280° C. was 11.5. The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

When the flash lamp was used, efficiency after 1 hour from start of laser oscillation was 1.68 times, which was higher compared to the use of the flash lamp of Comparative Example 1. However, after 50 hours from start of laser oscillation, laser power was drastically reduced and its efficiency was 0.76.

Next, the above-mentioned flash lamps which were used for laser oscillation of 50 hours were taken out. As a result of observing shape and color of the lamp tubes, the glass had been colored to brown. In addition, the lamp tube of the flash lamp used for the laser oscillation was cut to measure a visible light transmittance per 2.5 mm thickness. The internal transmittance at a wavelength of 530 nm was 76.2%. Therefore, it is found out that the visible light transmittance was reduced. Thus, it is found out that this copper-doped silica glass has inferior in long term stability.

Comparative Example 4

A silica porous body was produced and doped by copper, followed by performing unstuffing thereto under the same conditions as in Example 1. The silica porous body was placed in a heating furnace in which a silica glass was used as a furnace core tube, and then it was heated in a $N_2$ stream at a temperature of 1,100° C. for 12 hours to densify the silica porous body. After that, an atmosphere of the furnace was substituted with a hydrogen/helium mixed gas atmosphere of $H_2/He=20/80$, followed by heating it at a temperature of 1,500° C. for 4 hours to vitrify, whereby a cylindrical copper-doped silica glass having an outside diameter of 200 mm, an inside diameter of 100 mm and a length of 600 mm was obtained.

The copper-doped silica glass was extended and cut in the same way as in Example 1 to produce copper-doped silica glass tubes each having an outside diameter of 20 mm, a thickness of 2.5 mm, and a length of 250 mm.

A copper concentration contained in the silica glass tube was 50 wtppm, each of the concentrations of Na, K, Mg, Ca and Al was less than the detection lower limit of 0.05 wtppm. The OH group concentration was 140 ppm. The internal transmittance per 2.5 mm thickness at a wavelength of 530 nm was 91.0%. The total cross-sectional area of bubbles each having a diameter of 0.08 mm or more which had been contained in 100 $cm^3$ of the silica glass was 0.05 $mm^2$, and viscosity log at a temperature of 1,280° C. was 11.5 . The results are shown in Table 1.

With the obtained six (6) copper-doped silica glass tubes, six (6) xenon flash lamps each having light emitting portion which has an outside diameter of 20 mm and a length of 200 mm were produced to examine the laser oscillation characteristics in the same way as in Example 1. The results are shown in Table 2.

When the flash lamp was used, efficiency after 1 hour from start of laser oscillation was 1.44 times, which was slightly higher compared to the use of the flash lamp of Comparative Example 1 . However, after 50 hours from start of laser oscillation, laser power was drastically reduced and its efficiency was 0.67.

Next, the above-mentioned flash lamps which were used for laser oscillation of 50 hours were taken out. As a result of observing shape and color of the lamp tubes, the glass had been colored to brown. In addition, the lamp tube of the flash lamp used for the laser oscillation was cut to measure a visible light transmittance per 2.5 mm thickness. The internal transmittance at a wavelength of 530 nm was 74.2%. Therefore, it is found out that the visible light transmittance was reduced. Thus, it is found out that this copper-doped silica glass has inferior in long term stability.

Experimental Examples 1 and 2

As Experimental Example 1, copper-containing silica glass tubes were produced in the same way as in Example 1 and an internal transmittance spectrum per 2.5 mm thickness of the copper-containing silica glass was measured.

In addition, as Experimental Example 2, copper-containing silica glass tubes were produced in the same way as in Comparative Example 3 and an internal transmittance spectrum per 2.5 mm thickness of the copper-containing silica glass was measured.

Both results of Experimental Examples 1 and 2 are shown in FIG. 1.

The glass of Experimental Example 1 is the copper-containing silica glass in which cluster generation is suppressed. The glass of Experimental Example 2 is the copper-containing silica glass with cluster generation. As shown in FIG. 1, an internal transmittance of the glass in Experimental Example 1 in which cluster generation was suppressed shows high translucency at a wavelength region of 500 nm or more, whereas the glass of Experimental Example 2 in which cluster generation had occurred shows transmission loss at a wavelength region of 500 nm or more. As shown in FIG. 1, when distinguishing a degree of clusters by the transmittance, it is found out that it is preferable to distinguish at a wavelength region of 500 nm or more, and that it is optimum to distinguish at a wavelength of 530 nm which is an absorption peak wavelength of Nd:YAG.

The invention claimed is:

1. A method of producing copper-containing silica glass, comprising:
   hydrolyzing silicon compounds with an oxyhydrogen flame;
   producing silica particles from the hydrolyzed silicon compounds;
   depositing the silica particles to obtain a silica porous body;
   immersing the silica porous body in a solution containing copper ions;
   maintaining the silica porous body in the solution for a predetermined time;
   removing the silica porous body from the solution to dry; and
   vitrifying the dried silica porous body under an atmosphere that includes a mixed gas atmosphere of hydrogen and an inert gas containing hydrogen of from 0.01 vol % to 3 vol %, the vitrifying occurring at a temperature ranging from 1,350° C. to 1,600 ° C.,
   wherein vitrifying the silica porous body suppresses copper cluster formation in the copper-containing silica glass,
   wherein the copper-containing silica glass has copper of from 5 wtppm to 200 wtppm,
   wherein the total cross-sectional area of bubbles each having a diameter of 0.08 mm or more which are contained in 100 $cm^3$ thereof is 0.1 $mm^2$ or less,
   wherein each of concentrations Na, K, Mg, Ca and Al is less than 1 wtppm,
   wherein the OH group concentration is from 0.1 wtppm to 500 wtppm.

2. The method of claim 1, further comprising unsmiling the silica porous body after removing the silica porous body from the solution.

3. The method of claim 1, further comprising heating the silica porous body to a temperature ranging from 900° C. to 1,250° C. before vitrifying the dried silica porous body.

4. The method of claim 1, wherein the inert gas is nitrogen.

5. The method of claim 1, further comprising transmitting light with the copper-containing silica glass and exciting a laser with the light transmitted with the copper-containing silica glass.

6. The method of claim 5, wherein a difference in an expansion coefficient of the copper-containing silica glass and an expansion coefficient of copper clusters formed in the copper-containing silica glass permits the light required to excite the laser to be transmitted through the copper-containing silica glass.

7. The method of claim 1, wherein distortion of the copper-containing silica glass caused by a difference in expansion coefficients between the copper-containing silica glass and copper clusters that form during the method of producing the copper-containing silica glass is less than a threshold that causes the copper-containing silica glass to break.

8. The method of claim 1, further comprising irradiating the copper-containing silica glass with ultraviolet light with a wavelength ranging from 160 nm to 400 nm and emitting fluorescence having a peak wavelength in a range 520 nm to 580 nm from the copper containing silica glass.

9. The method of claim 8, wherein the copper-containing silica glass has a thickness of 2.5 mm, and the method further comprises transmitting 95% or more of light at a wavelength of 530 nm with the copper-containing silica glass.

10. A method of producing a silica glass tube that includes copper-containing silica doped in a solution containing copper ions, comprising
- hydrolyzing silicon compounds with an oxyhydrogen flame;
- producing silica particles from the hydrolyzed silicon compounds;
- depositing the silica particles to obtain a silica porous body;
- immersing the silica porous body in a solution containing copper ions;
- maintaining the silica porous body in the solution for a predetermined time;
- removing the silica porous body from the solution to dry;
- vitrifying the dried silica porous body under an atmosphere that includes a mixed gas atmosphere of hydrogen and an inert gas containing hydrogen of from 0.01 vol % to 3 vol %, the vitrifying occurring at a temperature ranging from 1,350° C. to 1,600° C.; and
- forming a silica glass tube that includes the vitrified silica porous body,
- wherein vitrifying the silica porous body suppresses copper cluster formation in the copper-containing silica glass,
- wherein the copper-containing silica glass has copper of from 5 wtppm to 200 wtppm,
- wherein the total cross-sectional area of bubbles each having a diameter of 0.08 mm or more which are contained in 100 $cm^3$ thereof is 0.1 $mm^2$ or less,
- wherein each of concentrations Na, K, Mg, Ca and Al is less than 1 wtppm,
- wherein the OH group concentration is from 0.1 wtppm to 500 wtppm.

11. The method of claim 10, further comprising unstuffing the silica porous body after removing the silica porous body from the solution.

12. The method of claim 10, further comprising heating the silica porous body to a temperature ranging from 900° C. to 1,250° C. before vitrifying the dried silica porous body.

13. The method of claim 10, wherein the inert gas is nitrogen.

14. The method of claim 10, wherein distortion of the copper-containing silica glass caused by a difference in expansion coefficients between the copper-containing silica glass and copper clusters that form during the method of producing the copper-containing silica glass is less than a threshold that causes the copper-containing silica glass to break.

* * * * *